(12) United States Patent
Tran et al.

(10) Patent No.: US 7,966,925 B2
(45) Date of Patent: Jun. 28, 2011

(54) COMBINATION MISMATCHED METAL-TO-METAL SEAL AND O-RING SEAL WITH VENT HOLE IN BETWEEN FOR HIGH TEMPERATURE AND HIGH PRESSURE ENVIRONMENT

(75) Inventors: Trung N. Tran, Torrance, CA (US); Constante A. Loresco, Laguna Niguel, CA (US); Filip A. Reinis, Long Beach, CA (US)

(73) Assignee: Honeywell International Inc, Morristown, NJ (US)

( * ) Notice: Subject to any disclaimer, the term of this patent is extended or adjusted under 35 U.S.C. 154(b) by 1418 days.

(21) Appl. No.: 11/673,427

(22) Filed: Feb. 9, 2007

(65) Prior Publication Data

US 2008/0191427 A1 Aug. 14, 2008

(51) Int. Cl.
*F16J 10/04* (2006.01)
*F01B 31/18* (2006.01)
(52) U.S. Cl. ........................................ 92/86; 92/171.1
(58) Field of Classification Search ........... 92/86, 169.1, 92/171.1
See application file for complete search history.

(56) References Cited

U.S. PATENT DOCUMENTS

| | | | |
|---|---|---|---|
| 951,704 A | 3/1910 | Schmidt | |
| 2,456,356 A | 12/1948 | Aber | |
| 2,766,999 A | 10/1956 | Watts et al. | |
| 3,340,774 A * | 9/1967 | Brenneke | 92/171.1 |
| 3,362,731 A | 1/1968 | Gasche et al. | |
| 3,694,010 A | 9/1972 | Callahan, Jr. | |
| 4,428,603 A | 1/1984 | Davlin | |
| 4,569,540 A | 2/1986 | Beson | |
| 4,601,498 A | 7/1986 | Haugen | |
| 5,269,537 A | 12/1993 | Kiesel | |
| 5,427,506 A | 6/1995 | Fry et al. | |
| 5,715,740 A | 2/1998 | Sims | |
| 5,848,813 A | 12/1998 | Albrecht | |
| 6,004,118 A | 12/1999 | Templar | |
| 6,045,165 A | 4/2000 | Sugino et al. | |

* cited by examiner

*Primary Examiner* — F. Daniel Lopez
(74) *Attorney, Agent, or Firm* — Oral Caglar, Esq.

(57) ABSTRACT

A sealing unit includes a mismatched metal-to-metal seal and an o-ring seal with a vent hole therebetween. The mismatched metal-to-metal seal may provide a sealing surface between two metals that may withstand high temperatures and pressure while avoiding leakage over many cycles. The sealing units of the present invention may provide a seal capable of withstanding pressures greater than about 5,000 psig, and typically greater than 6,000 psig, and more typically greater than 7,000 psig; and temperatures greater than about 300° F., and typically greater than about 400° F., and more typically greater than about 500° F. over a service life of more than 5,000 cycles. By providing a vent hole between the metal-to-metal seal and the o-ring seal, should either seal leak, damage to the other/good seal may be prevented by expelling the leak out of the system.

19 Claims, 4 Drawing Sheets

COMBINATION MISMATCHED METAL-TO-METAL SEAL AND O-RING SEAL WITH VENT HOLE IN BETWEEN FOR HIGH TEMPERATURE AND HIGH PRESSURE ENVIRONMENT

GOVERNMENT RIGHTS

This invention was made with Government support under government contract no. F33657-91-C-0006 awarded to Boeing Military Aircraft. The Government has certain rights in this invention.

BACKGROUND OF THE INVENTION

The present invention generally relates to a sealing system for high temperature and high pressure environments and, more specifically, to a sealing system having a mismatched metal-to-metal seal and an o-ring seal with a vent hole therebetween.

Generally, o-ring type seals are employed in piston or rod sealing applications to provide a seal between two adjacent cylindrical surfaces. These seals are subjected to various external forces and conditions throughout such use. At low pressure and low temperature conditions, seals can accommodate non-uniform pressure distribution due to the nature of their composition, for example, resilient, flexible and elastic materials such as rubber and elastomeric substances. Seals subjected to high pressure, for example, greater than about 3,000 pounds per square inch gauge (psig), and high temperature, for example, greater than about 300 degrees Fahrenheit (° F.) tend to deform, and gradually extrude into, for example, a gap between the adjacent cylindrical surfaces. In addition, elevated temperatures eventually greatly reduce the physical qualities of resilient, flexible, and elastic materials, and cause such materials to buckle under non-uniform pressure distribution. Seals eventually succumb to such high pressure and high temperature conditions, and their replacement becomes necessary.

Engineers have attempted to design more resilient seals by redesigning their shape, for example, increasing/decreasing their diameters, thicknesses, etc., or by altering the seal's composition in order improve their ability to withstand higher temperatures and pressures, and to increase the seal's service life. However, an important design challenge is the machinery parameters themselves, that is, the existing width, depth and diameter of the recessed portion, groove, or gland of the machine's seal surfaces.

A conventional seal design is an o-ring sandwiched between two retainer rings, as described in U.S. Pat. No. 2,456,356. However, this prior art seal design is not tailored to meet the current operating conditions due to its shortcomings described therein. As disclosed in the '356 patent, the o-ring was meant to possess a diameter of greater cross-section than the recessed section, or groove, so that when pressure was applied to the o-ring, the o-ring would force the retainer rings to extrude outside the recessed portion in order to create a static seal. Such a design cannot effectively be utilized in present high pressure and/or high temperature applications. Modern seal designs avoid deforming the ring members to the point of extrusion, in order to prolong the service life of the seal. In present day high pressure and/or high temperature applications, the constant extrusion as described and taught in the '356 patent will cause the seal to deform, buckle and extrude, and fail much sooner than desired.

Another seal design of the prior art incorporates a single composite ring, as described and taught in U.S. Pat. No. 5,269,537. As disclosed in the '537 patent, the composite ring includes an elastomeric seal ring having a circumferentially disposed u-cup end that forms an annular pressure cavity, a highly resilient energizer ring embedded within the seal ring, and an integral anti-extrusion ring located opposite the u-cup edge and bonded integrally to the seal ring. As described, the annular pressure cavity is in fluid communication with an annular passage in order to communicate fluid pressure from the strut to the recessed section, groove or gland, that is, the cavity is exposed to pressurized hydraulic fluid. Although the teachings pertain to high hydraulic pressure applications, the seal's design becomes less than desirable and even potentially hazardous when applied to a pneumatic application involving gas turbine engines. Such high pressure/high temperature applications would continually expose not only the annular pressure cavity, but also the u-cup and its two "legs," to extreme operating conditions without protection. The seal design of the '537 patent did not contemplate the deleterious effects of high pressure and/or high temperature conditions of pneumatic applications, and consequently could not effectively endure such operating environments.

Metal-to-metal seals have been conventionally used for connecting together two metal tubes. U.S. Pat. No. 6,045,165 describes a tube connector/coupling created by the deformation of the male tube member to form two metal-to-metal sealing surfaces with the female member. The deformation of the male tube under rotational torque forms an annular metal-to-metal seal between the male tube outside diameter and the female connector inside diameter. A second metal-to-metal sealing surface is formed as the tip of the tube butts against an internal shoulder of the female connector. The sealing system of the '165 patent, however, due to its requirement for metal deformation under rotational torque, may not be useful in circumstances where such deformation is undesirable, such as in cases were removal of one part and replacement thereof may be needed.

Referring to FIG. 1, a high pressure, high temperature compressor assembly 10 may generally comprise a housing 11 having a chamber 12 containing a first port 14 and a second port 16. Chamber 12 may support a piston 18 positioned for selective movement within chamber 12. To ensure that a static seal exists between chamber 12 and first port 14, a sealing unit 20 may be employed and supported in a recessed portion 22 of chamber 12. Sealing unit 20 may be positioned in recessed portion 22 in order to maintain a static seal under temperatures in excess of about 380° F., and typically about 400° F., and more typically about 500° F.; and pressures of at least about 1,750 psig and greater than about 5,000 psig, and typically greater than about 6,000 psig, and more typically greater than about 7,000 psig. To cool assembly 10 during operation, a polyalphaolefin coolant ("PAO feed") may be fed through a cooling channel 28 disposed within and supported by chamber 12, and disposed between chamber 12 and housing 11, and proximate to sealing unit 20. The PAO feed may circulate at about 200 psig and about 180° F., for example, in order to prevent assembly 10 from overheating. Under typical operating conditions, the external temperature gradient acting upon housing 11 proximate to sealing unit 20 may typically be in excess of about 400° F., and more typically about 500° F. due to external pressures exceeding about 5,000 psig, and typically about 6,000 psig, and more typically 7,000 psig that act upon assembly 10.

The sealing system of FIG. 1 may however, after several cycles, begin to leak. Air recharge systems (ARS) require long lasting (>5,000 cycles) seals for the high pressure (>5,000 psig), high temperature (>400° F.) environment of the ARS compressor. A small amount of leakage from either seals 20, 28 may cause serious failure in the compressor.

As can be seen, there is a need for a sealing system able to operate under conditions such as pressures greater than about 5,000 psig and temperatures greater than about 400° F. without experiencing deformation, buckling, and extrusion. There also exists a need for a seal capable of maintaining a longer service life than seals that are presently commercially available.

SUMMARY OF THE INVENTION

In one aspect of the present invention, a sealing system comprises a metal-to-metal seal formed between a first component having a first mating surface and a second component having a second mating surface, wherein: the first mating surface has a first angle relative to a central axis and the second mating surface has a second angle relative to the central axis; and the first angle is different by from about 3 to about 10 degrees from the second angle.

In another aspect of the present invention, a sealing system comprises a metal-to-metal seal formed between a first component having a first mating surface and a second component having a second mating surface; an o-ring seal formed between the first component and the second component; and a vent hole in between the metal-to-metal seal and the o-ring seal.

In a further aspect of the present invention, a method for preventing damage to a compressor due to leakage of a sealing system comprises forming a metal-to-metal seal between a cylinder head and a cylinder base; forming a second seal between the cylinder head and the cylinder base; venting air leaked through the metal-to-metal seal out through a vent hole; and venting coolant leaked through the second seal out through the vent hole.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention may be useful in the general context of two or more seal surfaces. For example, the apparatus of the present invention may be used in pressurized vessels to prevent the escape of pressure or in systems containing two or more separate mediums to prevent them from mixing together. The present invention is also well suited for use in high pressure hydraulic equipment; high performance pneumatic, vacuum and compressor systems; and high pressure systems in general where stationary, oscillatory, rotary or reciprocating surfaces may be sealed.

The present invention generally provides a mismatched metal-to-metal seal and an o-ring seal with a vent hole therebetween. The mismatched metal-to-metal seal may provide a sealing surface between two metals that may withstand high temperatures and pressure while avoiding leakage over many cycles. The mismatched metal-to-metal seal may have mismatched materials or mismatched angles, as discussed in further detail below. The sealing units of the present invention may provide a seal capable of withstanding pressures greater than about 5,000 psig, and typically greater than 6,000 psig, and more typically greater than 7,000 psig; and temperatures greater than about 300° F., and typically greater than about 400° F., and more typically greater than about 500° F. over a service life of more than 5,000 pressure cycles. One cycle may be defined, for example, as ambient pressure to 5,300 psig and back to ambient pressure. Unlike conventional seals, which may either employ only o-ring seals, subject to extruding, or which may use metal-to-metal seals that require metal deformation, the metal-to-metal seal of the present invention provides a substantially leak-free seal while not requiring metal deformation to create the sealing surfaces or requiring a conventional seal in between the two sealing surfaces.

Figure 1:
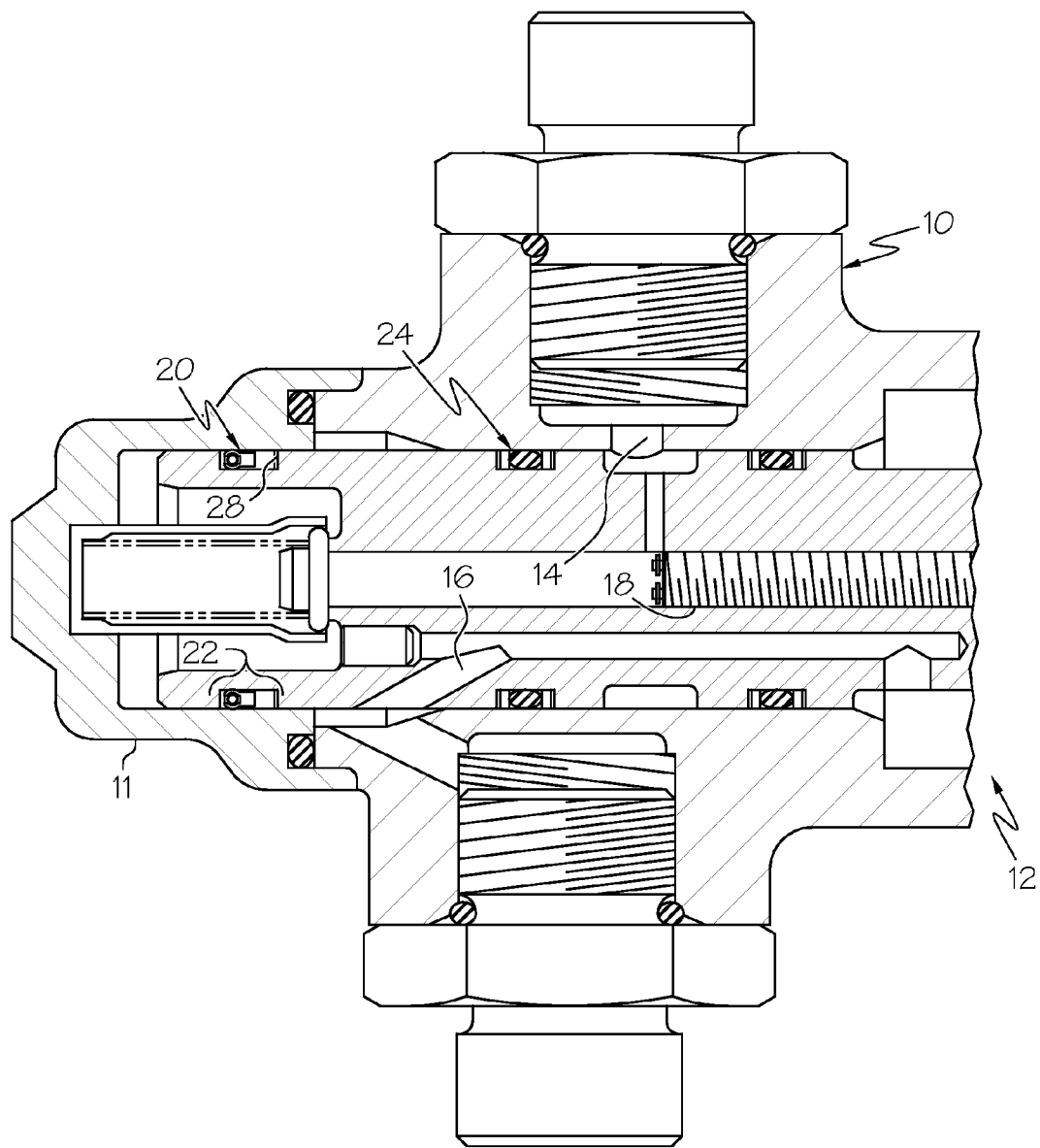
FIG. 1 is a partial cross-sectional view of a high pressure, high temperature compressor assembly incorporating a conventional, prior art sealing unit.
Figure 2:
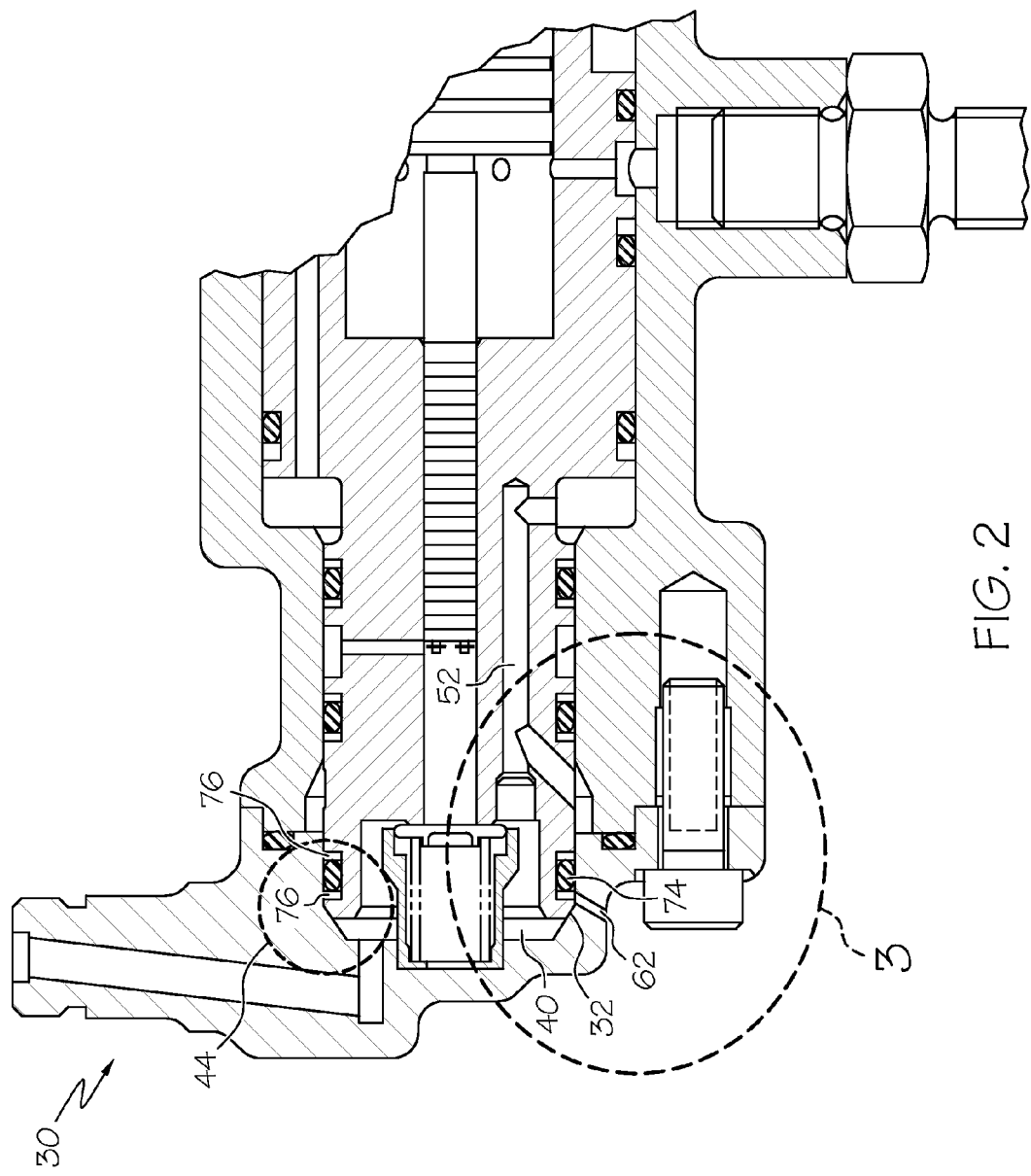
FIG. 2 is a partial cross-sectional view of an assembly incorporating a metal-to-metal seal according to an embodiment of the present invention.

Referring to FIG. 2, there is shown partial cross-sectional view of a compressor assembly 30 incorporating a metal-to-metal seal 32 as part of a multiple component sealing unit 44 (hereinafter "sealing unit 44") according to an embodiment of the present invention. The metal-to-metal seal 32 may seal air pressure within a port 40. Port 40 may be an air outlet port of the compressor assembly 30 of a air recharge system. Typically, such a metal-to-metal seal 32 may be useful in high temperature and pressure environments (for example, about 5,300 psig and about 450F). The sealing unit 44 may seal coolant, such as liquid polyalphaolefin (PAO), within a cooling channel 52. The sealing unit 44 may include an o-ring 74 sandwiched between two backup rings 76. Typically, such a sealing unit 44 may be useful at temperatures of at least about 200F and pressures of at least 180 psig. The sealing unit 44 may be similar to those disclosed in commonly owned U.S. patent application Ser. No. 10/966,741, herein incorporated in its entirety by reference. A vent hole 62 may be positioned between the metal-to-metal seal 32 and the sealing unit 44 to prevent either leak (air to PAO or PAO to air) from extruding or causing damage to the other seal.

Figure 3:
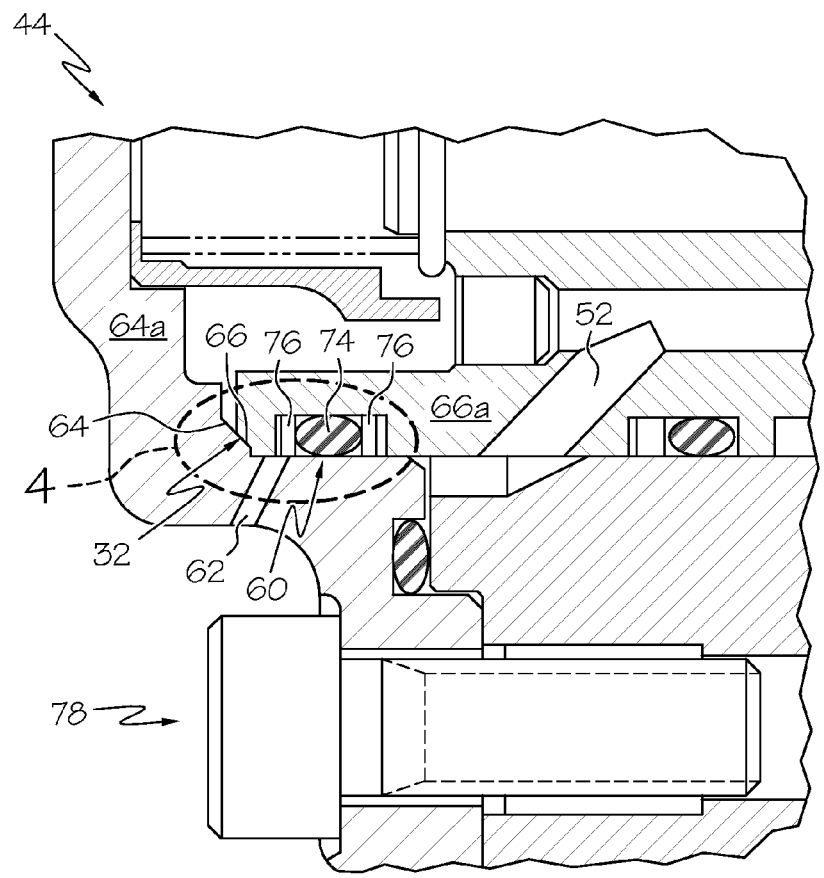
FIG. 3 is an enlarged cross-sectional view of area 3 of FIG. 2.
Figure 4:
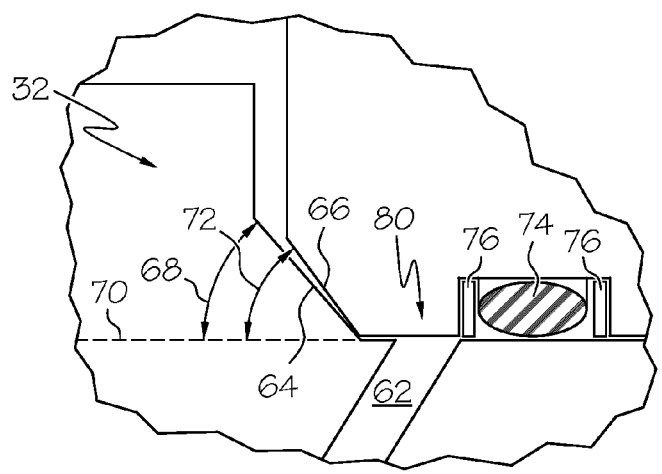
FIG. 4 is a close-up view of area 4 of the metal-to-metal seal of FIG. 3, according to an embodiment of the present invention.

Referring now to FIG. 3, there is shown an enlarged cross-sectional view of area 3 of FIG. 2 showing the first sealing unit 44. Also referring to FIG. 4, there is shown a close-up view of the metal-to-metal seal 32 of the present invention. The first sealing unit 44 includes the metal-to-metal seal 32, an o-ring seal 60 and a vent 62 in between the metal-to-metal seal 32 and the o-ring seal 60.

The metal-to-metal seal 32 may include a first mating surface 64 and a second mating surface 66. The first mating surface 64 may be, for example, part of a cylinder head 64a and the second mating surface 66 may be, for example, part of a cylinder base 66a. The first mating surface 64 may have an angle 68 relative to a central axis 70 and the second mating surface 66 may have an angle 72 relative to the central axis 70. The angle 68 may be from about 35 to about 45 degrees, while the angle 72 may be from about 40 to about 50 degrees. Typically the angle 68 may be about 40 degrees while the angle 72 may be about 45 degrees. In one embodiment of the present invention, the mismatchedness between the angles (that is, the difference between the angle 68 and the angle 72) may be from about 3 to about 10 degrees, typically about 5 degrees.

The metal-to-metal seal 32 may be formed with two different metals forming the first mating surface 64 and the second mating surface 66. In one embodiment of the present invention, the first mating surface 64 may be made of heat treated stainless steel, for example, stainless steel 15-5PH heat treated to H1025 with 34-42 HRC. The second mating surface 66 may be made of iron, for example, ductile iron grade 80-55-06.

The metal-to-metal seal 32 may be made by pressing together the first mating surface 64 with the second mating surface 66. These two surfaces 64, 66 may be held together to form the metal-to-metal seal 32 with, for example, four equally spaced bolts 78. In one embodiment of the present invention, the two surfaces 64, 66 are brought together to form the metal-to-metal seal 32 without the need for rotational torque between the two surfaces 64, 66. In other words, unlike conventional metal-to-metal seals, the metal-to-metal seal 32 of the present invention does not require metal deformation of either of the surfaces 64, 66 in order to form the metal-to-metal seal 32.

The o-ring seal 60 may include an o-ring 74 sandwiched in between two back-up rings 76. The design of o-ring seal 60 may be a conventional design similar to, for example, that disclosed in commonly owned U.S. patent application Ser. No. 10/966,741, and as described above with reference to the second sealing unit 48.

Although o-rings are typically constructed from flexible, resilient materials as known in the art, o-ring 74 of the present invention may be constructed using any number of materials possessing the physical qualities necessary to withstand high pressures and resist high temperatures, and even low temperatures associated with coolants. For example, o-ring 74 may be comprised of materials such as synthetic rubber compositions, elastomeric substances, particularly silicone based compositions, fluoropolymer based compositions, fluorosilicone based compositions, other plastics such as polyether etherketone, polyamides, polyimides, polyethersulfone, other hi-modulus plastic compositions, a combination comprising at least one of the foregoing materials, and the like, alone or in combination with one or more reinforcing materials and/or additives, such as plasticizers, thermal stabilizers, antioxidants, light stabilizers, flame retardants, lubricants, foaming agents, blowing agents, surfactants, metal stabilizers, organostabilizers, organometallic stabilizers, additives comprising at least one of the foregoing, and the like.

In some embodiments, o-ring 74 may comprise a graphite reinforced fluoropolymer material, such as graphite reinforced Teflon®, which is commercially available from General Electric Silicones in Pittsfield, Mass., or Viton®, which is commercially available from DuPont Dow Elastomers® LLC, Wilmington, Del.

The vent hole 62 may fluidly communicate a region 80 between the cylinder head 64a and the cylinder base 66a with ambient. This region 80 may be located between the metal-to-metal seal 32 and the o-ring seal 60. The vent hole 62 may prevent seal damage/extrusion if either the metal-to-metal seal 32 or the o-ring seal 60 should fail. For example, in an air recharge system, high pressure air may be located adjacent to the metal-to-metal seal 32. Should this seal 32 develop a leak, without the vent hole 62, this leaking high pressure air may impinge upon the o-ring seal 60, causing possible damage/extrusion thereof. Should the high pressure air leak pass the o-ring seal 60, it may dilute the coolant in the cooling channel 52 thereby causing possible overheating of the compressor 31 of the air recharge system. The vent hole 62 also prevent air leakage to enter the PAO system or vice versa, PAO leakage to enter the air system preventing contamination in the aircraft systems.

Figure 5:
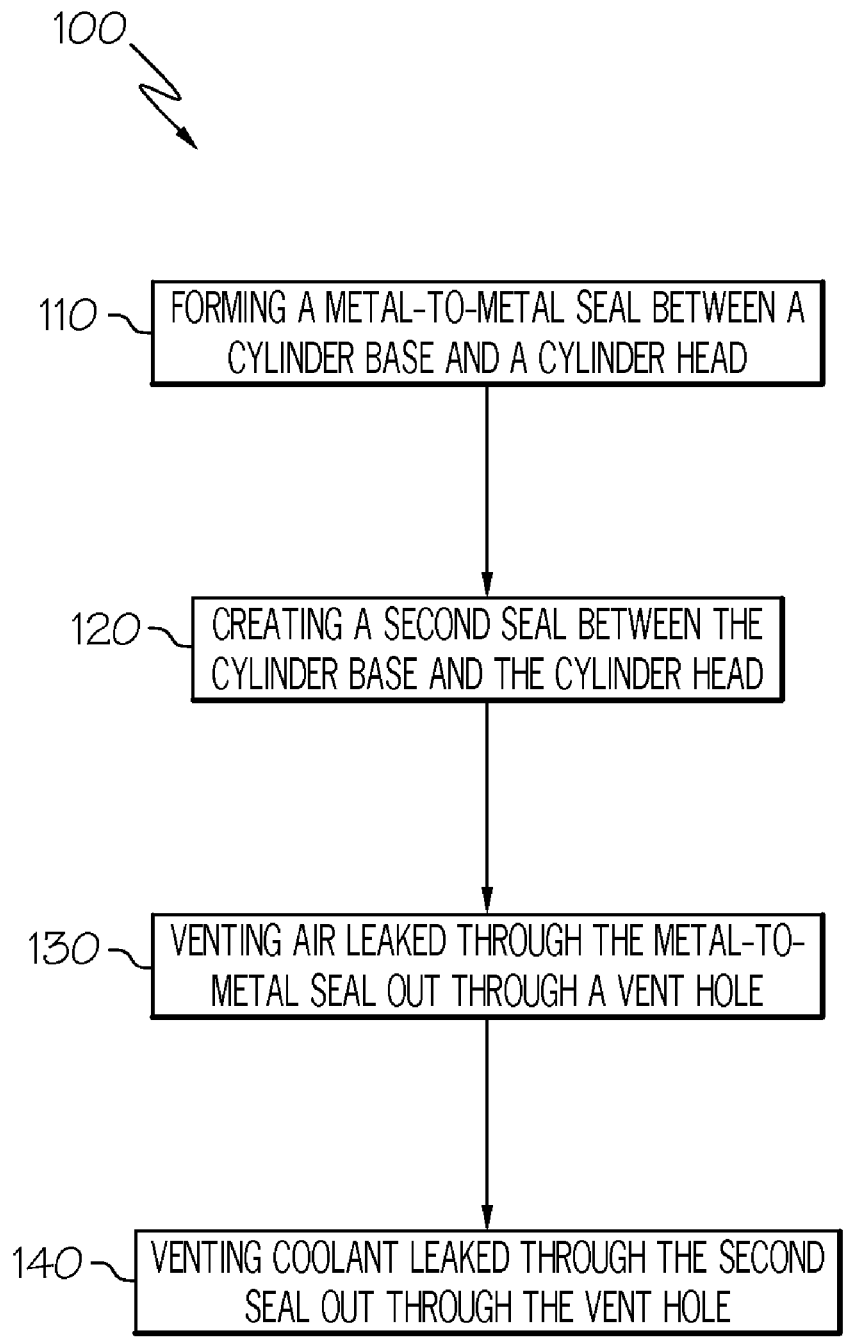
FIG. 5 is a flow chart describing a method for sealing cylindrical members according to an embodiment of the present invention.

Referring to FIG. 5, there is shown a flow chart describing a method 100 for preventing damage to a compressor caused by seal leakage. The method 100 may include a first step 110 of forming a metal-to-metal seal (e.g., a seal 32) between the cylinder base (e.g., cylinder base 66a) and the cylinder head (e.g., cylinder head 64a). A second step 120 may create a second seal (e.g., seal 60 or 74) between the cylinder base and the cylinder head. The metal-to-metal seal may seal high pressure air formed from the compressor from leaking into a space between the cylinder head and the cylinder base. The second seal may seal coolant, such as PAO, in the cooling channels from leaking into a space between the cylinder head and the cylinder base. A step 130 may vent air leaked through the metal-to-metal seal out through a vent hole. This step 130 may vent any air leaked through the metal-to-metal seal before the air reaches the second seal. A step 140 may vent coolant leaked through the second seal out through the vent hole. This step 140 may vent any coolant leaked through the second seal before the coolant reaches the metal-to-metal seal. By providing the vent hole, any leakage may be released prior to causing detrimental damage such as coolant in the compressed air or compressed air in the coolant.

It should be understood, of course, that the foregoing relates to exemplary embodiments of the invention and that modifications may be made without departing from the spirit and scope of the invention as set forth in the following claims.

We claim:

1. A sealing system, comprising:
a metal-to-metal seal formed between a first component having a first mating surface and a second component having a second mating surface, wherein:
the first mating surface has a first angle relative to a central axis and the second mating surface has a second angle relative to the central axis;
the first angle is different by from about 3 to about 10 degrees from the second angle;
the first angle is from about 35 to about 45 degrees; and
the second angle is from about 40 to about 50 degrees.

2. The sealing system according to claim 1, wherein the first angle is about 40 degrees and the second angle is about 45 degrees.

3. The sealing system according to claim 1, wherein the first component is a cylinder head of a compressor and the second component is a cylinder base of the compressor.

4. The sealing system according to claim 3, wherein the compressor is a compressor in an aircraft air recharge system.

5. The sealing system according to claim 1, wherein the first component and the second component comprise a first metal and a second metal, wherein the first metal and the second metal are different.

6. The sealing system according to claim 5, wherein the first metal is heat treated stainless steel and the second metal is iron.

7. The sealing system according to claim 1, further comprising:
an o-ring seal between the first component and the second component; and
a vent hole between the metal-to-metal seal and the o-ring seal.

8. The sealing system according to claim 7, wherein the o-ring seal includes an o-ring sandwiched between two backup rings.

9. The sealing system according to claim 1, further comprising four equally spaced bolts, the bolts providing a force joining the first component with the second component, thereby providing the metal-to-metal seal without rotational torque between the first component and the second component.

10. The sealing system according to claim 1, wherein the metal-to-metal seal operates in an environment with pressure >5000 psig and temperature >400° F. for at least 5000 pressure cycles without leakage.

11. A sealing system comprising:
a metal-to-metal seal formed between a first component having a first mating surface and a second component having a second mating surface;
an o-ring seal formed between the first component and the second component; and
a vent hole in between the metal-to-metal seal and the o-ring seal.

12. The sealing system according to claim 11, wherein:
the first mating surface has a first angle relative to a central axis and the second mating surface has a second angle relative to the central axis;
the first angle is from about 35 to about 45 degrees; and
the second angle is from about 40 to about 50 degrees.

13. The sealing system according to claim 12, wherein:
the first component is a cylinder head made of a first metal and the second component is a cylinder base made of a second metal; and
the first metal and the second metal are different.

14. The sealing system according to claim 12, wherein the first angle is less than the second angle.

15. A method for preventing damage to a compressor due to leakage of a sealing system, the method comprising:
forming a metal-to-metal seal between a cylinder head and a cylinder base;
forming a second seal between the cylinder head and the cylinder base;
venting any air leaked through the metal-to-metal seal out through a vent hole; and
venting any coolant leaked through the second seal out through the vent hole.

16. The method according to claim 15, further comprising:
mating a first mating surface of the cylinder head and a second mating surface of the cylinder base to form the metal-to-metal seal, wherein
the first mating surface has a first angle relative to a central axis and the second mating surface has a second angle relative to the central axis; and
the first angle is different by from about 3 to about 10 degrees from the second angle.

17. The method according to claim 15, further comprising forming the cylinder head from a first metal and forming the cylinder base from a second metal, wherein the first metal is different from the second metal.

18. The method according to claim 15, further comprising joining the cylinder head with the cylinder base without exerting rotational torque between the cylinder head and the cylinder base.

19. The method according to claim 15, wherein:
the first angle is from about 35 to about 45 degrees;
the second angle is from about 40 to about 50 degrees; and
the first angle is less than the second angle.

* * * * *